US012374847B2

(12) United States Patent
Little et al.

(10) Patent No.: US 12,374,847 B2
(45) Date of Patent: Jul. 29, 2025

(54) CABLE ASSEMBLY WITH INSERT-MOLDED LEAD-FRAME ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Terrance F. Little, Fullerton, CA (US); Richard Lee Malehorn, II, York, PA (US); Haozhe Zi, Irvine, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 591 days.

(21) Appl. No.: 17/708,472

(22) Filed: Mar. 30, 2022

(65) Prior Publication Data

US 2022/0329032 A1 Oct. 13, 2022

Related U.S. Application Data

(60) Provisional application No. 63/168,242, filed on Mar. 30, 2021.

(51) Int. Cl.

| | |
|---|---|
| ***H01R 43/24*** | (2006.01) |
| ***H01R 12/72*** | (2011.01) |

(Continued)

(52) U.S. Cl.

CPC ........... *H01R 43/24* (2013.01); *H01R 12/724* (2013.01); *H01R 12/75* (2013.01); *H01R 13/405* (2013.01); *H01R 13/6471* (2013.01)

(58) Field of Classification Search

CPC ...... H01R 43/24; H01R 12/724; H01R 12/75; H01R 13/405; H01R 13/6587;

(Continued)

(56) References Cited

U.S. PATENT DOCUMENTS 8,845,364 B2 * 9/2014 Wanha ................ H01R 13/516 439/607.07
9,011,177 B2 4/2015 Lloyd (Continued)

FOREIGN PATENT DOCUMENTS

| | | |
|---|---|---|
| CN | 107086397 A | 8/2017 |
| CN | 113328296 A | 8/2021 |

*Primary Examiner* — Michael C Zarroli

(74) *Attorney, Agent, or Firm* — Ming Chieh Chang

(57) ABSTRACT

A cable assembly includes a cable module including a first metallic strip integrally formed with an insulative bar via a first insert-molding process; and a second metallic strip integrally formed with the insulative bar via a second-molding process following the first insert-molding process. The second metallic strip includes plural pairs of contacts originally connected thereto via corresponding linking portions. The insulative bar forms a plurality of openings and the first metallic strip forms a plurality of corresponding punching openings respectively aligned with each other and further aligned with the corresponding linking portions, respectively, in a transverse direction so as to remove the corresponding linking portions after the second insert-molding process.

6 Claims, 19 Drawing Sheets

(51) Int. Cl.
*H01R 12/75* (2011.01)
*H01R 13/405* (2006.01)
*H01R 13/6471* (2011.01)

(58) Field of Classification Search
CPC ........ H01R 13/648; H01B 7/40; H01B 11/00; H05K 1/0237; H05K 2201/10356
See application file for complete search history.

(56) References Cited

U.S. PATENT DOCUMENTS

| | | | | |
|---|---|---|---|---|
| 10,403,565 | B1* | 9/2019 | Henry ................ | H01R 13/6596 |
| 10,680,364 | B2 | 6/2020 | Champion et al. | |
| 2009/0221165 | A1* | 9/2009 | Buck .................. | H01R 13/6471<br>439/108 |
| 2021/0044040 | A1 | 2/2021 | Zheng et al. | |
| 2021/0194183 | A1 | 6/2021 | Guo | |
| 2022/0216635 | A1* | 7/2022 | Little ................... | H01R 13/514 |
| 2022/0247131 | A1* | 8/2022 | He ..................... | H01R 13/6586 |

* cited by examiner

340

CABLE ASSEMBLY WITH INSERT-MOLDED LEAD-FRAME ASSEMBLY

CROSS REFERENCE TO RELATED APPLICATIONS

This application claims priority to U.S. Provisional Patent Application No. 63/168,242 filed Mar. 30, 2021, the content of which is incorporated herein by reference in its entirety.

BACKGROUND OF THE INVENTION

1. Field of the Invention

The invention relates to a cable assembly, and particularly to an array of wires assembled upon a printed circuit board.

2. Description of Related Arts

Conventional interconnection systems are found in electronic devices such as routers and servers and the like, and are used to form a signal transmission line that extends between a primary chip member mounted on a printed circuit board of the device, such as an ASIC, and a connector mounted to the circuit board. The signal transmission line typically takes the form of a plurality of conductive traces that are etched, or otherwise formed on or as part of the printed circuit board. While the conductive traces on PCB is more and more replacing with cable connections, as Co-Packaged Copper (CPO) developed in Optical Internetworking Forum (OIF). U.S. Pat. No. 9,011,177B discloses such a cable connection and shows the construction of the cable bypass assembly.

An improved connector assembly is desired.

SUMMARY OF THE INVENTION

An object of the present invention is to provide a cable assembly that can be made by an improved manufacturing process.

A cable assembly comprises a cable module, the cable module comprising a first metallic strip integrally formed with an insulative bar via a first insert-molding process, and a second metallic strip integrally formed with the insulative bar via a second insert-molding process following the first insert-molding process. The second metallic strip comprises plural pairs of contacts originally connected thereto via corresponding linking portions. The insulative bar forms a plurality of openings and the first metallic strip forms a plurality of corresponding punching openings respectively aligned with each other and further aligned with the corresponding linking portions, respectively, in a transverse direction so as to remove the corresponding linking portions after the second insert-molding process.

Other objects, advantages and novel features of the disclosure will become more apparent from the following detailed description when taken in conjunction with the accompanying drawings.

DETAILED DESCRIPTION OF THE PREFERRED EMBODIMENT

Figure 1:
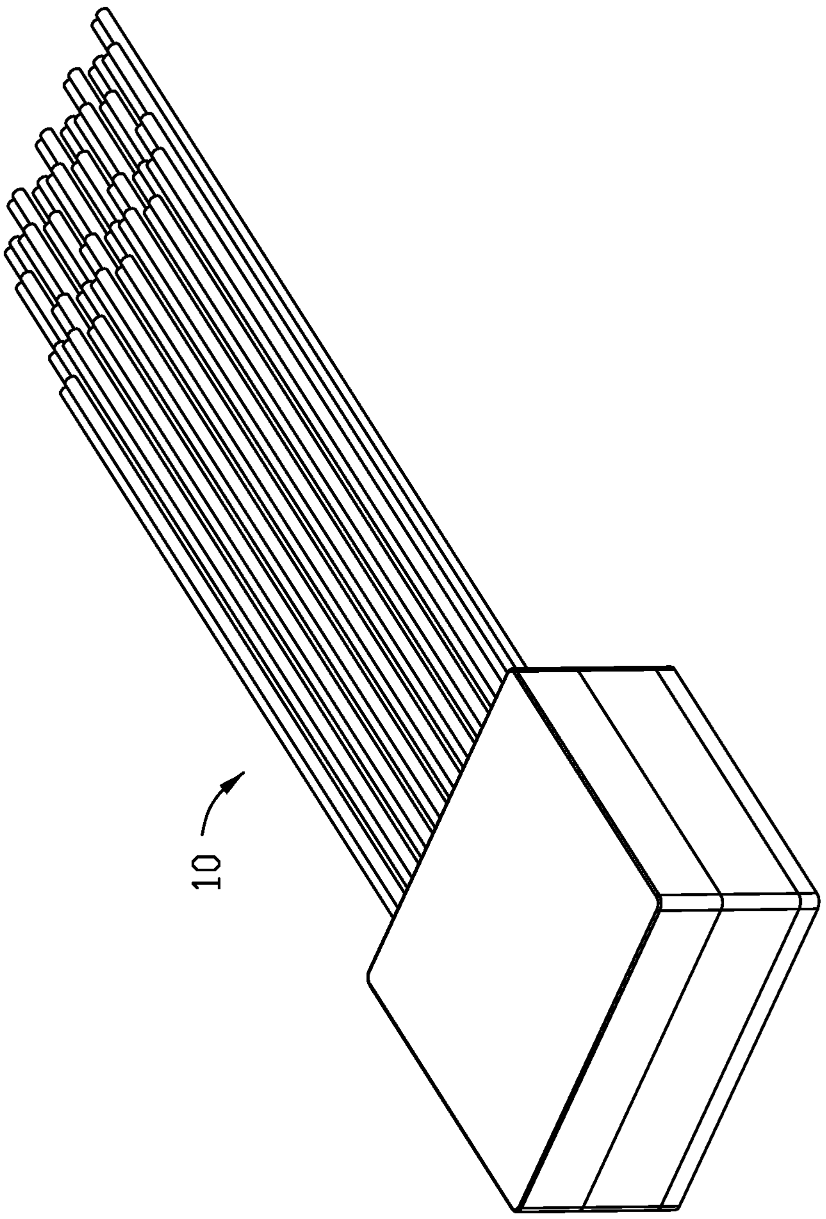
FIG. 1 is a perspective view of a cable assembly according to a preferred embodiment of the invention.

Reference will now be made to the drawing figures to describe the preferred embodiment of the present invention in detail.

Figure 2:
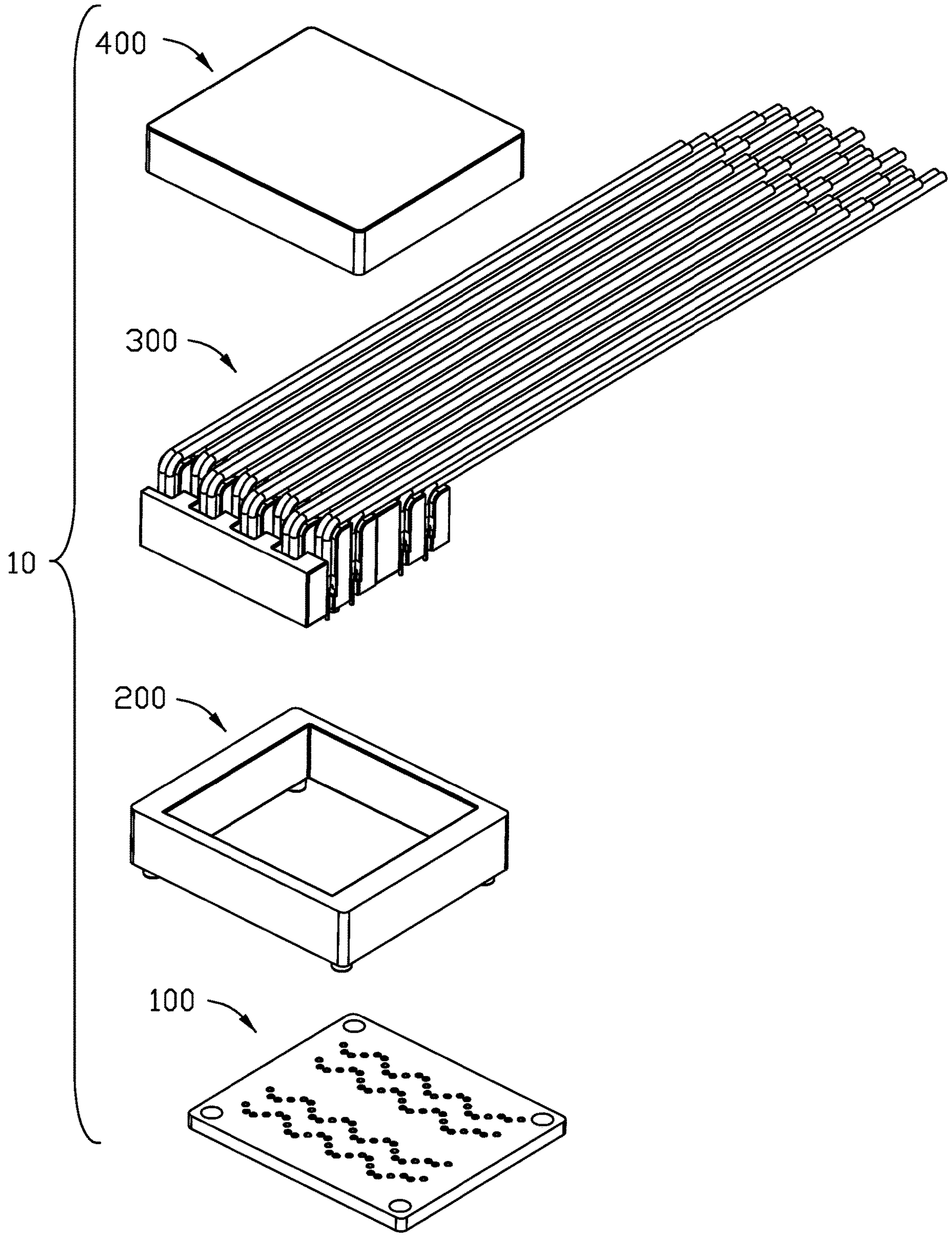
FIG. 2 is an exploded perspective view of the cable assembly of FIG. 1.
Figure 3:
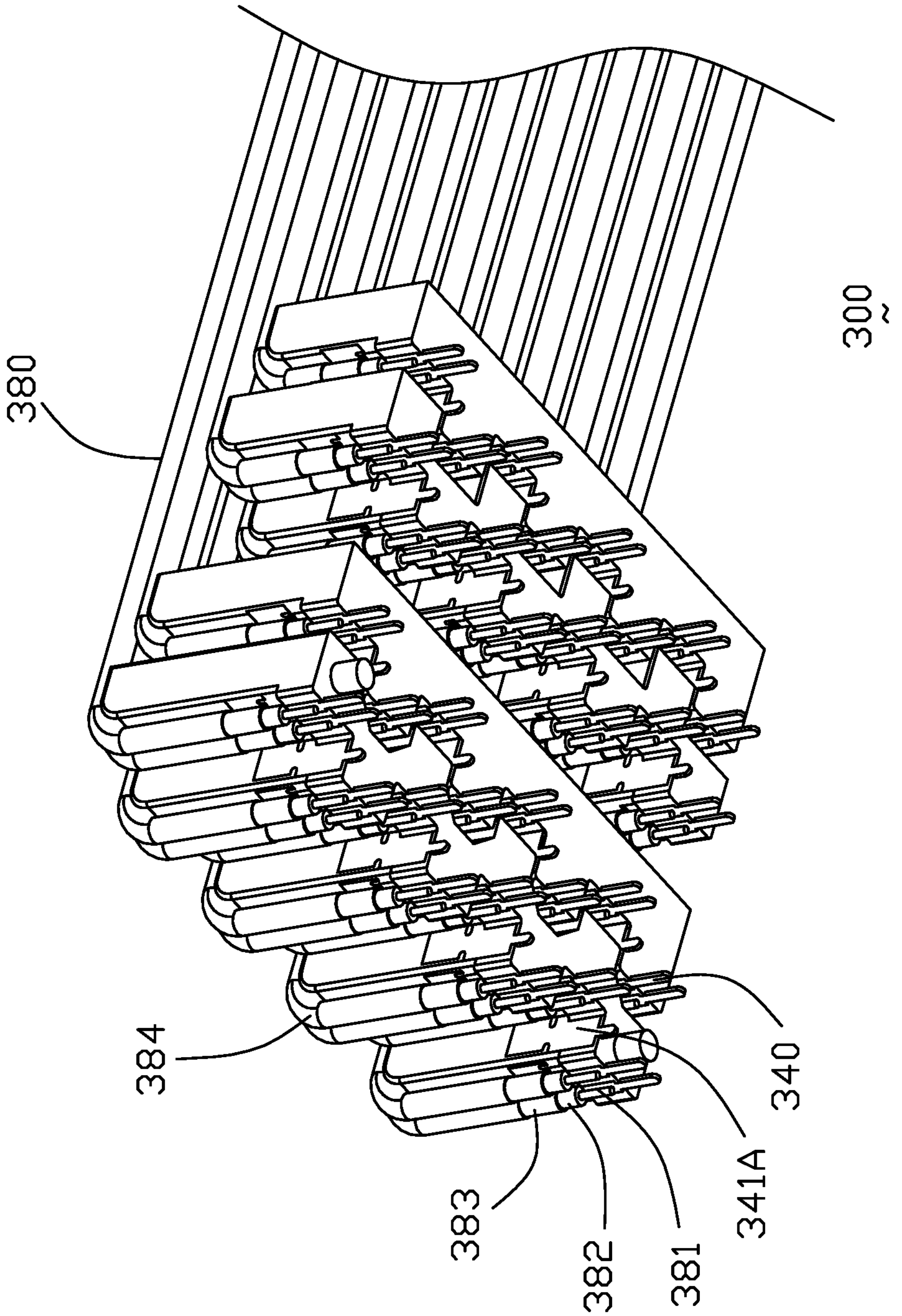
FIG. 3 is a perspective view of cable modules of the cable assembly of FIG. 1, wherein assisting insulating bars are removed.
Figure 13:
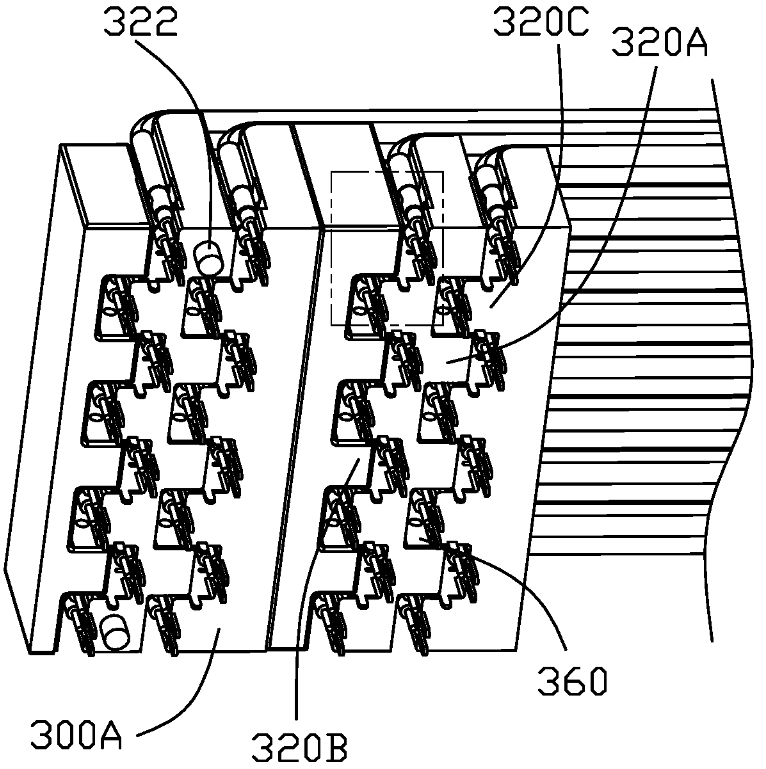
FIG. 13 is another perspective view of the cable module of FIG. 2.
Figure 14:
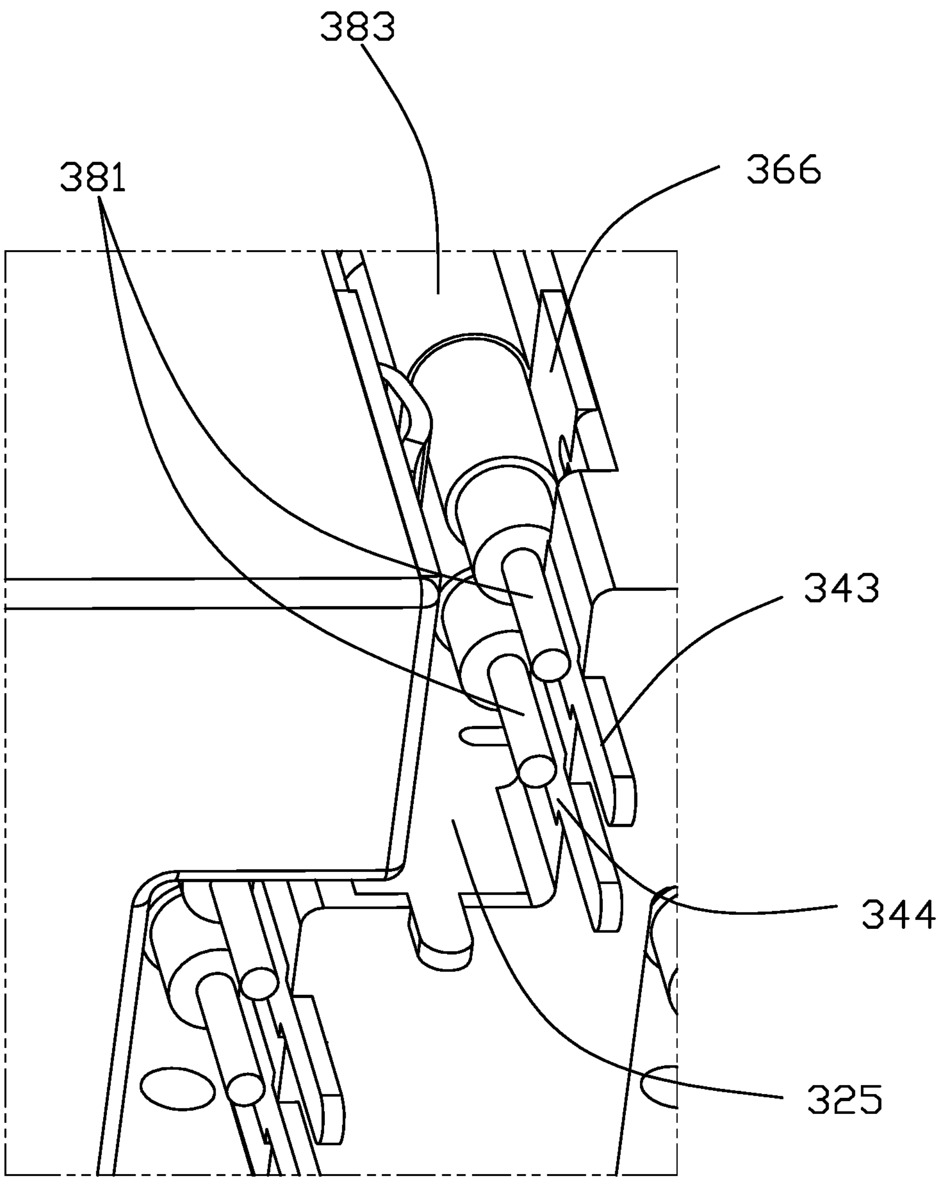
FIG. 14 is an enlarged perspective view of portion of the cable modules of FIG. 13.
Figure 15:
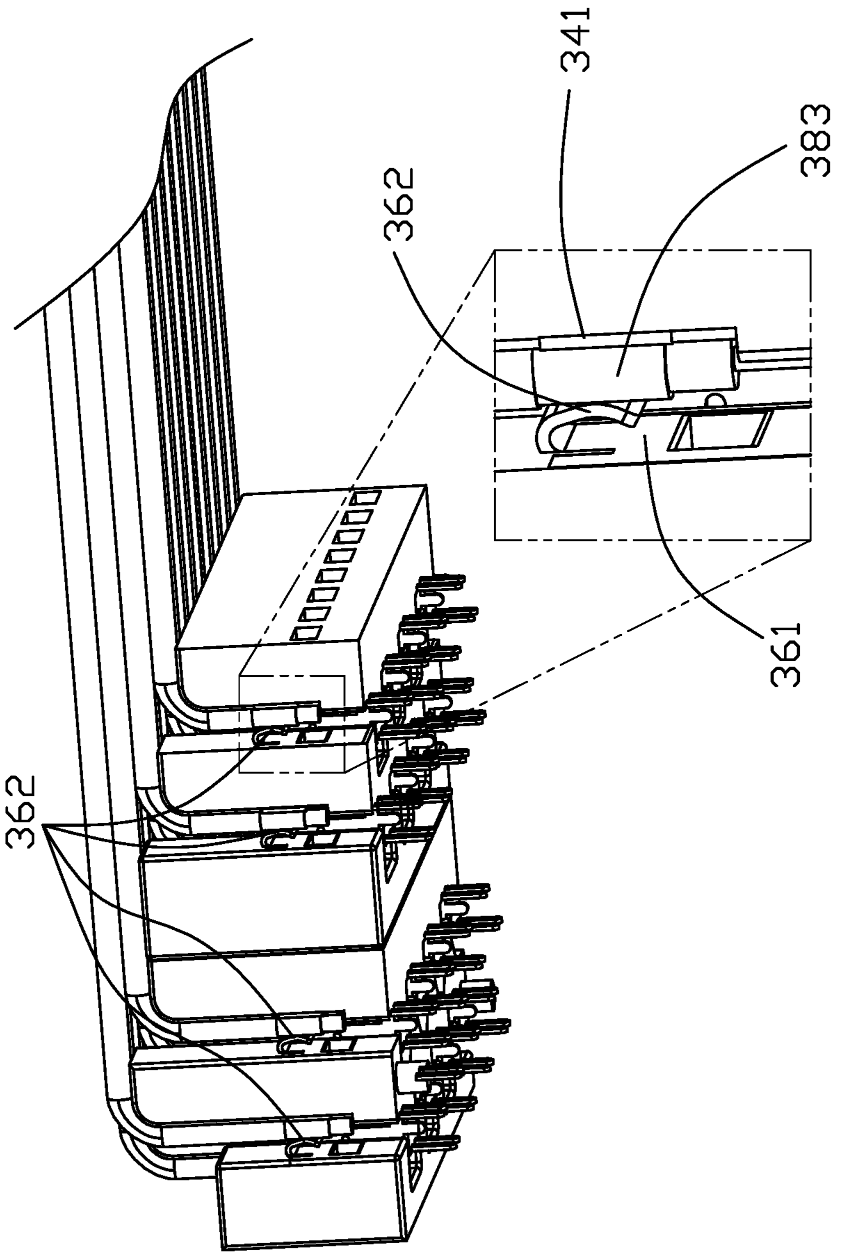
FIG. 15 is another perspective view of the cable module of FIG. 2.

As shown in FIGS. 1 and 2, a cable assembly 10 of this embodiment of the present invention includes cable modules 300 which is an Insert-Molded Lead-frame Assembly (IMLA) received within the organizer/housing 200 and shielded by a top cover 400 as a unit to be mounted to a printed circuit board 100. Referring to FIG. 3, the cable modules 300 include a plurality of cable modules stacked with one another in a transverse direction to be the cable module assembly. In fact, in the preferable embodiment disclosed in the instant application, as shown in FIGS. 13-15, the cable modules 300 are arranged with two groups each having a middle/assisting insulative bar 320 sandwiched between an inner insulative bar 320A and an outer insulative bar 320B.

Figure 4:
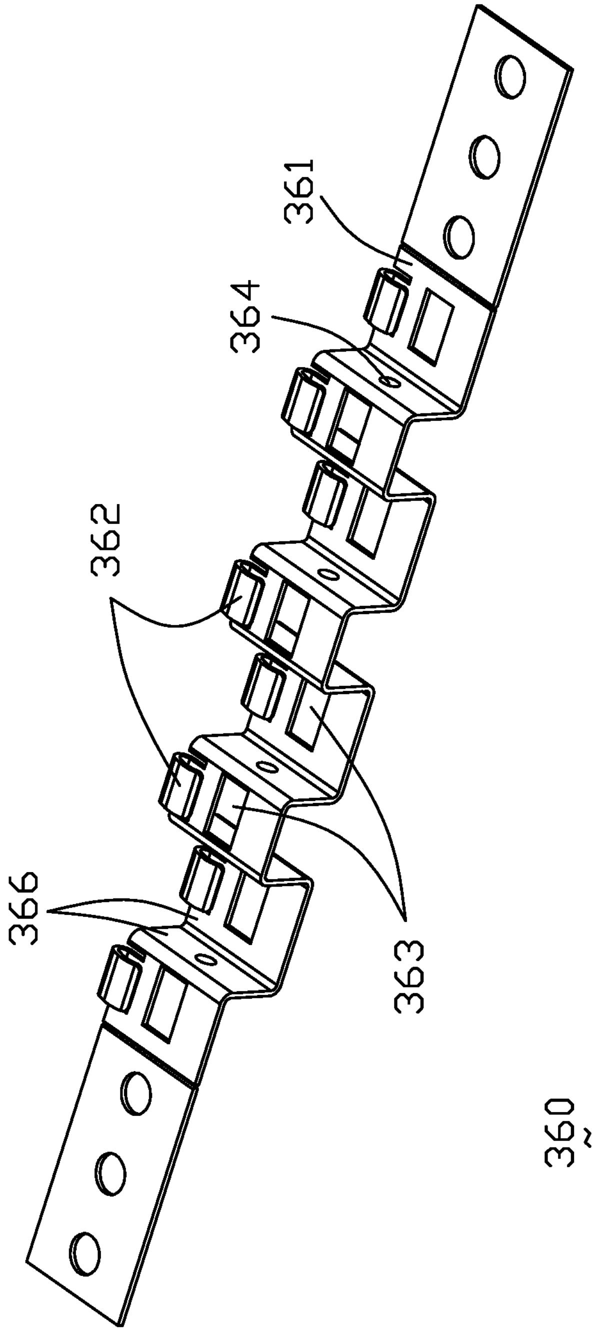
FIG. 4 is a perspective view of a first metallic strip of the cable module of FIG. 3.
Figure 5:
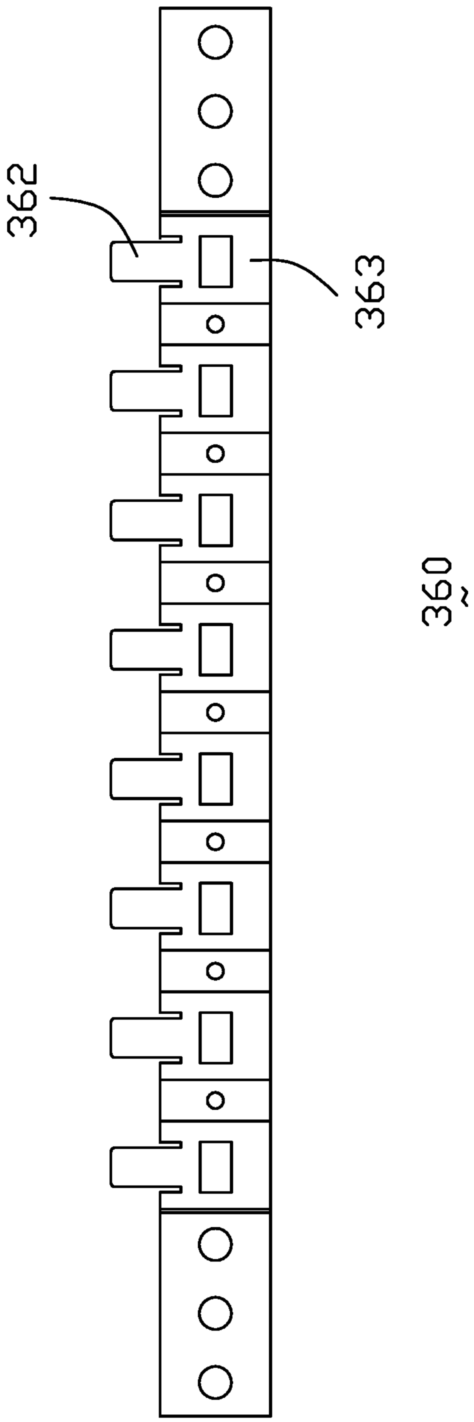
FIG. 5 is a top view of the first metallic strip before bending.
Figure 6:
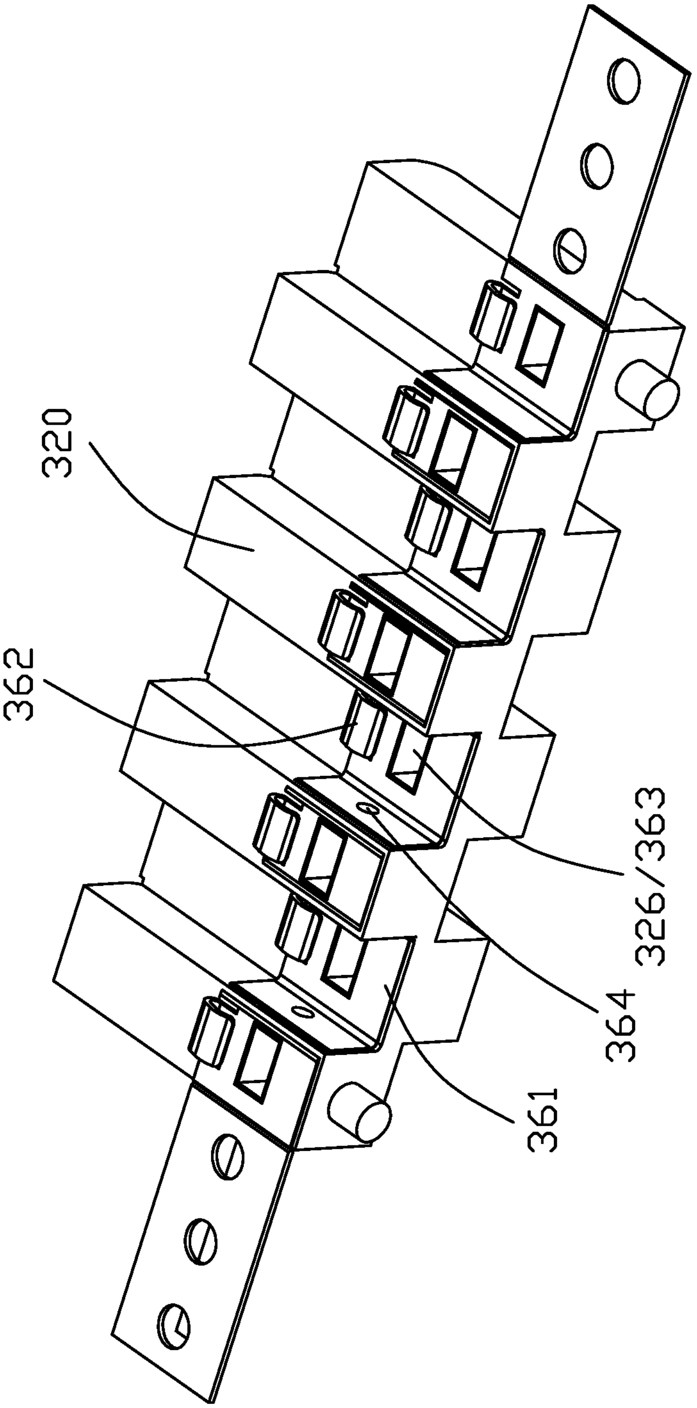
FIG. 6 is a perspective view of the first metallic strip insert-molded with the insulative bar of the cable module of FIG. 3 via a first insert-molding process.
Figure 7:
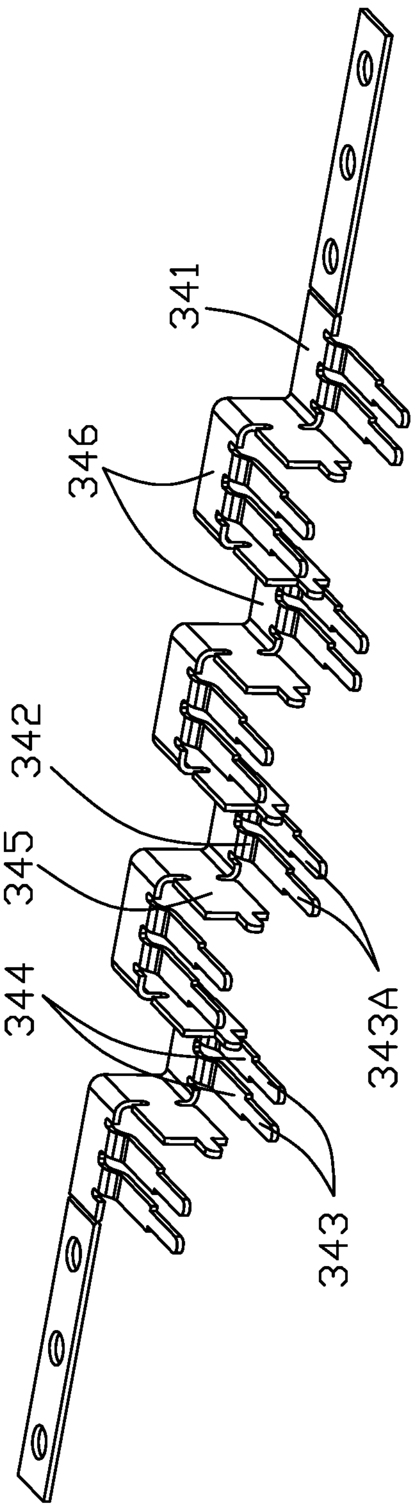
FIG. 7 is a perspective view of a second metallic strip of the cable module of FIG. 3.
Figure 8:
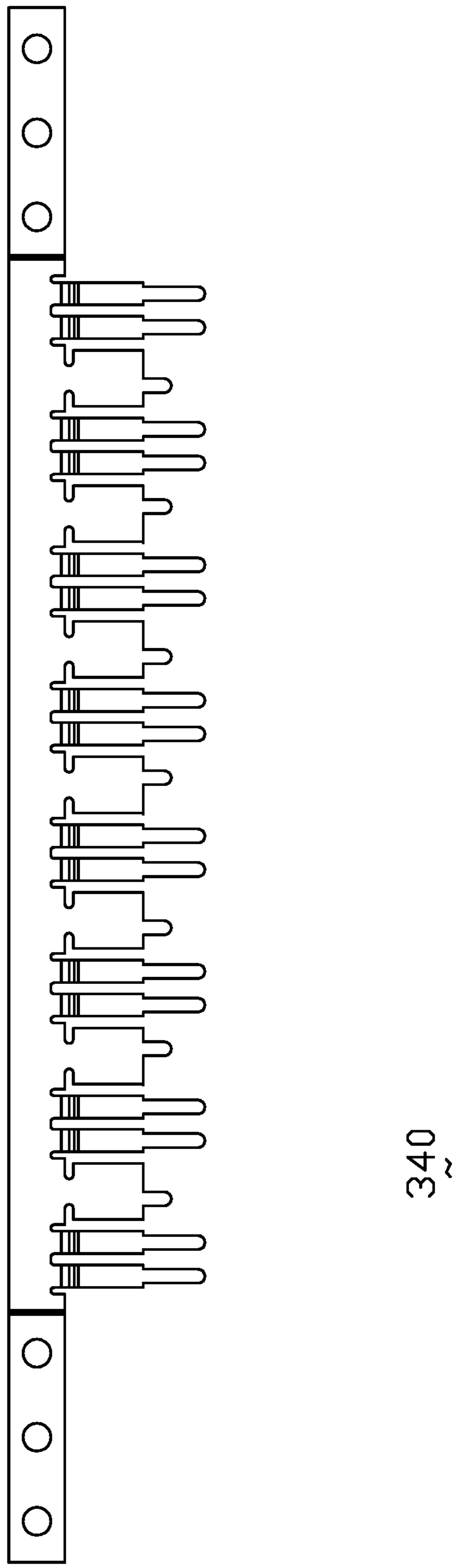
FIG. 8 is a top view of the second metallic strip before bending.
Figure 9:
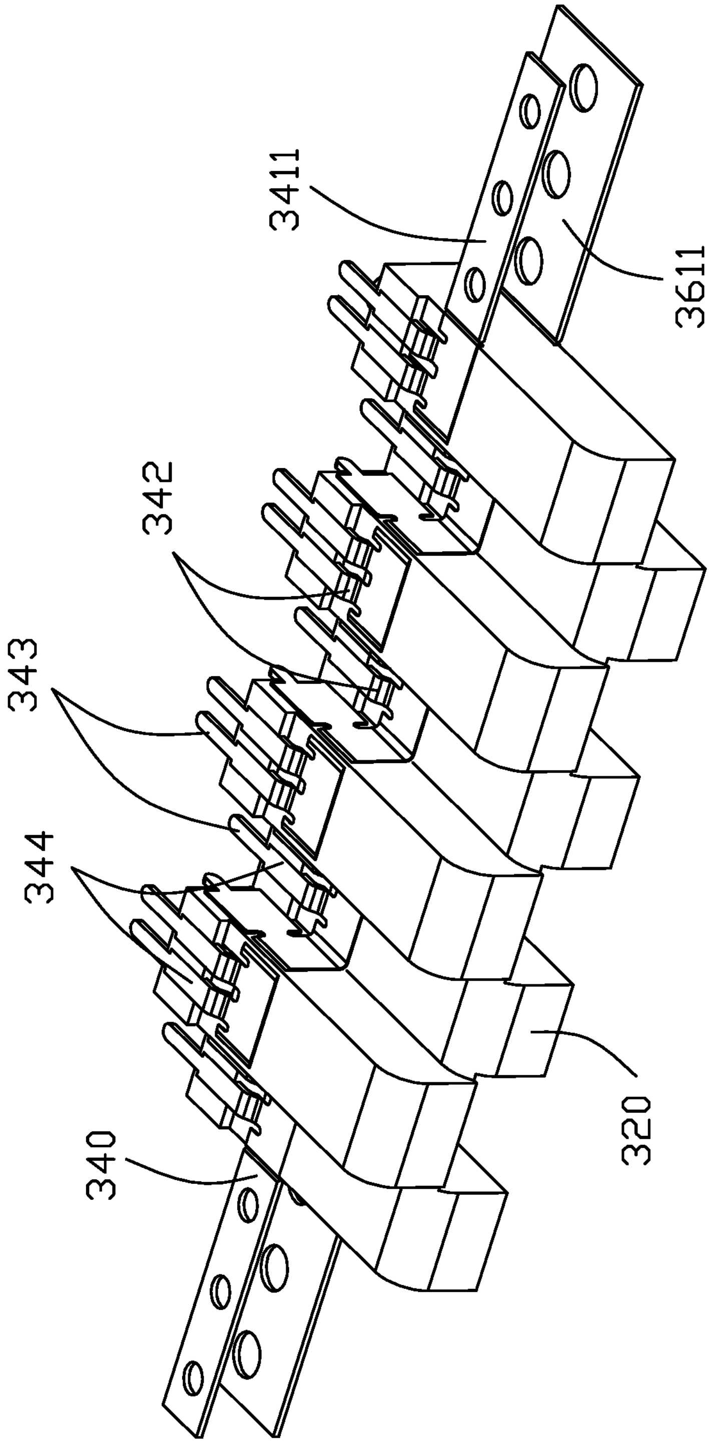
FIG. 9 is a perspective view of the corresponding cable module of FIG. 6 after the second metallic strip is integrally formed on the insulative bar via a second insert-molding process.
Figure 10:
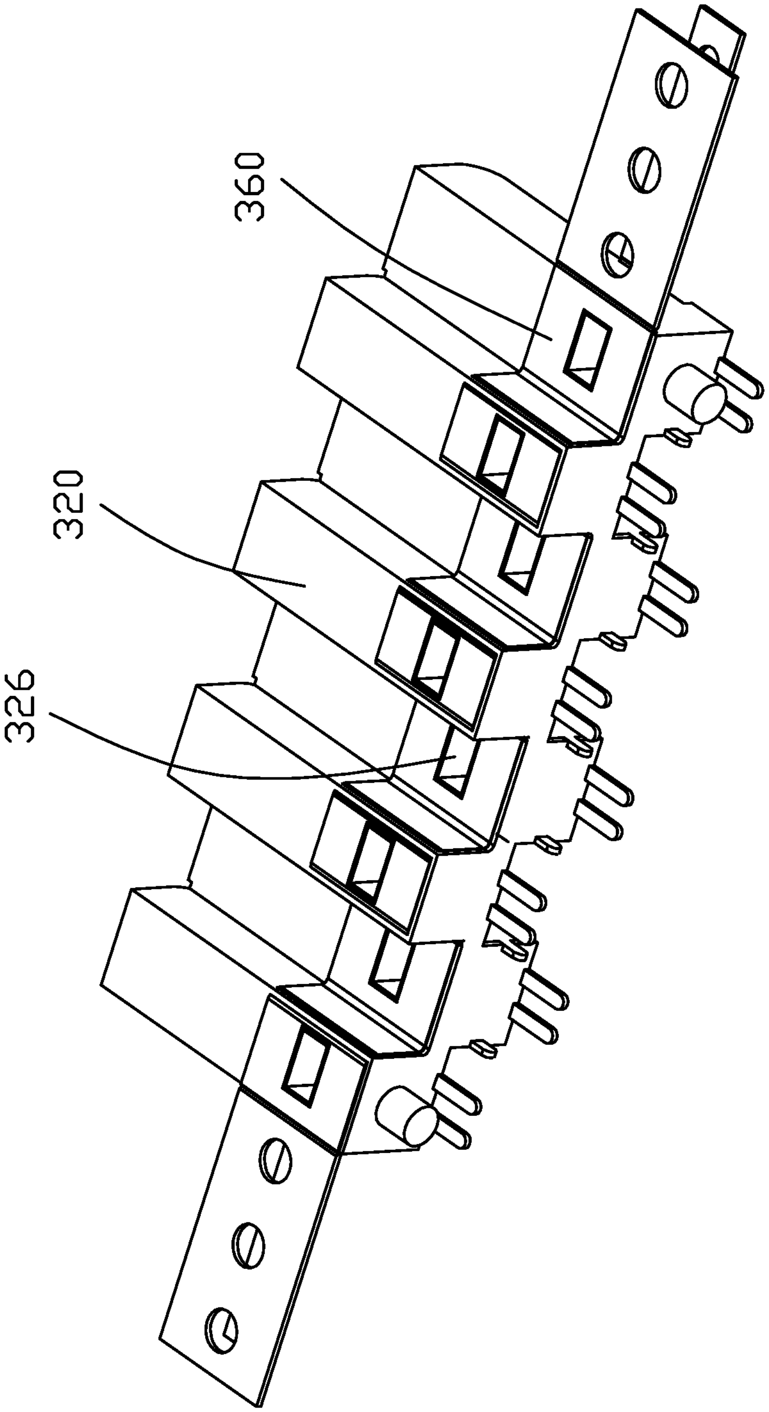
FIG. 10 is another perspective view of the cable module of FIG. 9 without showing the corresponding wires and the spring tabs.

As shown in FIGS. 4 and 6, a first metallic strip 360 or a common grounding bar is integrally formed with the insulative bar 320 via an insert-molding, the metallic strip 360 includes an elongated body 361 extending along a longitudinal direction and forming a zigzag/serpentine like configuration composed of a plurality of sections 366 arranged in a concave-convex pattern, each section 366 forms a spring tab 362, a punching opening 363 and two opposite receiving holes 364 which receive the material of the insulative bar 320 therein for securely fixing the first metallic strip 360 upon the insulative bar 320. The spring tabs 362 folds downward from an upper edge of the elongated body 361.

A second metallic strip 340 or a common signal-contact-grounding bar is integrally formed with the insulative bar 320 via another/second insert-molding, the second metallic strip 340 includes an elongated body 341 extending along the longitudinal direction and forming a zigzag/serpentine like configuration composed of a plurality of segments 346 arranged in a concave-convex pattern. Each segment 346 forms a pair of contacts 343A each having a mounting/signal leg 343 for mounting to the printed circuit board 100 and a connecting section 344 for connecting to the corresponding wire (illustrated later). The contacts 343A are originally linked to the elongated body 341 via the linking portions 342. Each segment 346 further includes a pair of grounding legs 345 lying in a plane perpendicular to another plane on which the mounting legs 343 are located.

Figure 11:
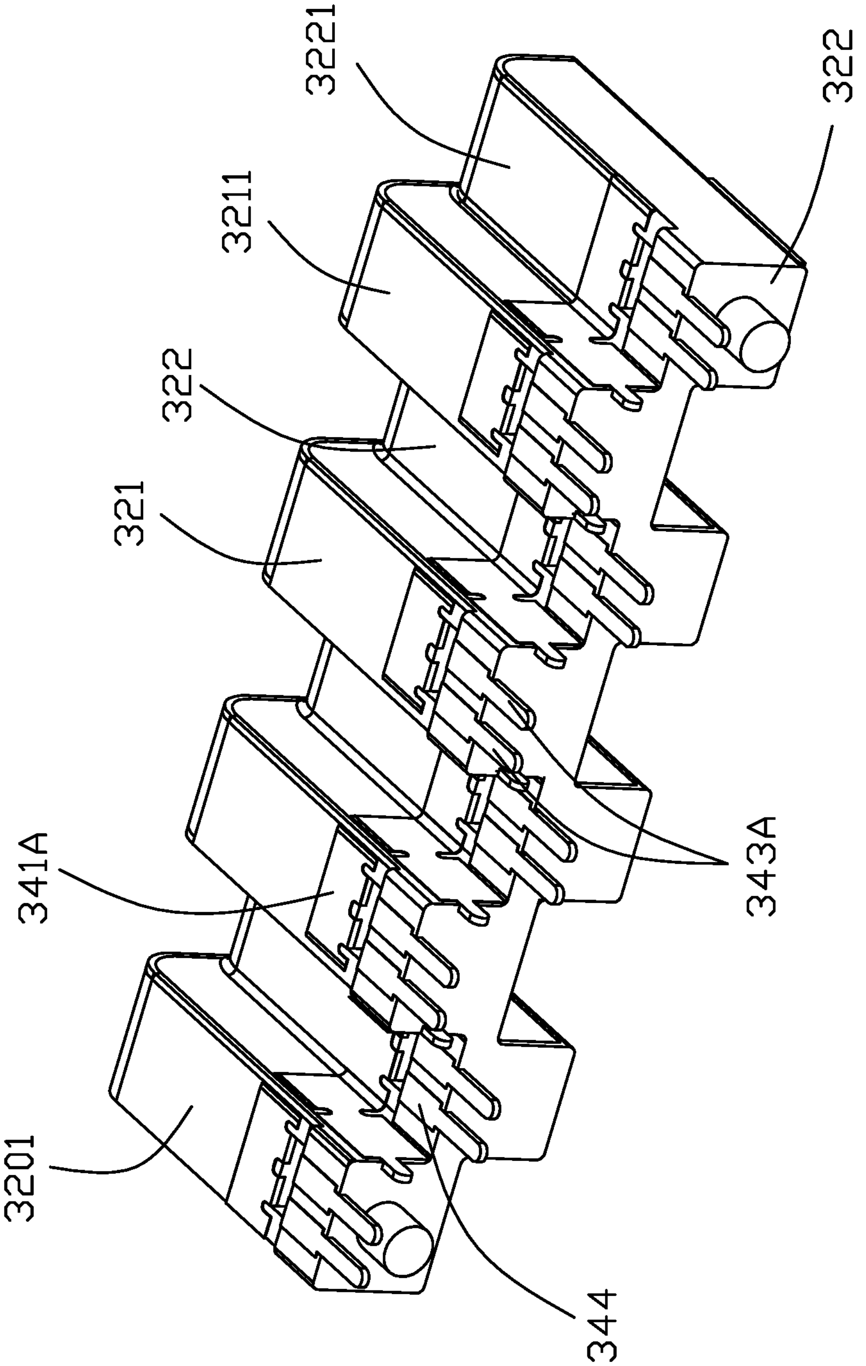
FIG. 11 is a perspective view of the cable module of FIG. 8 wherein the redundant end regions of both the first and second metallic strips are removed, and the linking portions are also removed so as to have the contacts no longer joined with the second metallic strip substantially.
Figure 12:
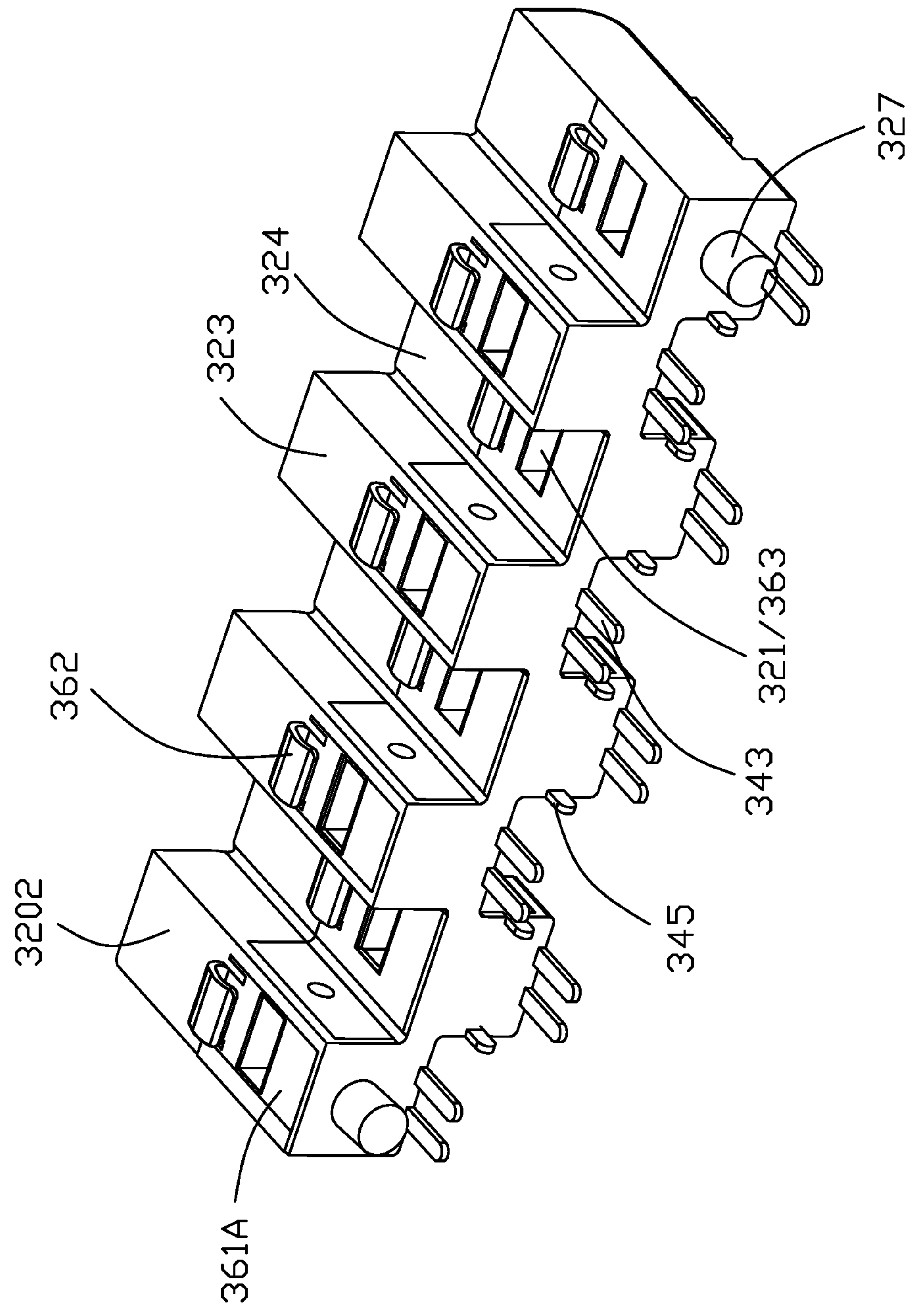
FIG. 12 is another perspective view of the cable module of FIG. 2.

The insulative bar 320 extending along the longitudinal direction, includes a zigzag/serpentine like configuration to comply with the configurations of both the first metallic strip 360 and the second metallic strip 340, respectively, wherein the two metallic strip 360, 340 are respectively located on two opposite sides of the insulative bar 320 in the transverse direction perpendicular to the longitudinal direction. A plurality of openings 321 are formed in the insulative bar 320 in alignment with the corresponding punching openings 363 and the linking portions 342, respectively. Notably, via both the openings 321 and the punching openings 363, the linking portions 342 can be removed after the second metallic strip 340 is integrally formed upon the insulative bar 320 via the second insert-molding following the first insert-molding via which the metallic strip 360 is integrally formed with the insulative bar 340. After the assisting strip 3411, 3611 of the metallic strips 340, 360 are cut away, as best shown in FIGS. 11-12, the elongated body 341 of the first metallic strip 340 is functioned as a rear grounding bar 341A, the elongated body 361 of the first metallic strip 360 is functioned as a front grounding bar 361A which is located in front of the rear grounding bar 341A. The contact 343A is below the front grounding bar 361A as best shown in FIG. 3. Understandably, once the pair of contacts 343A including the corresponding connecting sections 344 and the mounting legs 343 are separated from elongated body 341, the second metallic strip 340 no longer relates to the signal matters.

Referring to FIGS. 11 to 15, the insulative bar 320 defines a plurality of projecting portions 321 and recesses 321 at the front side 3201 in the transverse direction and alternatively arranged, the projecting portions 321 forms peak faces 3211 and the recesses 322 form valley faces 3221. Each of the peak faces 3211 and the valley faces 3221 is provided with one pair of the contacts 343A, the connecting sections 344 exposes upon the faces and the mounting legs 343 extend downward beyond the insulating bar 320. The front grounding bar 341A is configured to expose upon the projecting portions 321 and the recesses 322. The grounding legs 345 exposes upon an upright face connecting with the peak face 3211 and the valley face 3221.

The insulative bar 320 also defines projecting portions 323 and recesses 324 at a rear side 3202 in the transverse direction, and peak faces and valley faces are defined at the projecting portions 323 and the recesses 324, respectively. The rear grounding bar 361A exposes upon the projecting portions 323 and the recesses 324

Referring to FIG. 3, each module 300 includes a plurality of differential-pair wires 380 each having a pair of inner conductor 381, a pair of inner insulator 382, a pair of metallic braiding layer 383 and a pair of outer insulator 384 respectively concentrically arranged with one another. In conjunction with FIGS. 14-15, the inner connector 381 is mechanically and electrically connected to the connecting section 344 and the braiding layer 383 is sandwiched between the corresponding spring tab 362 and the corresponding segment 366. Notably, the braiding layer 383 is preferably soldered upon the corresponding segment 366 of the elongated body 341. It is also noted that the zigzag like configuration forms a plurality of spaces 325, each having four sides in a cross-sectional view, to receive therein the corresponding differential-pair wires 380 wherein the elongated body 341 provide three sides shielding in the space 325 and the elongated body 361 of the neighboring module 300 provides the remaining one side shielding so as to form the so-called four-sided complete shielding.

Figure 16:
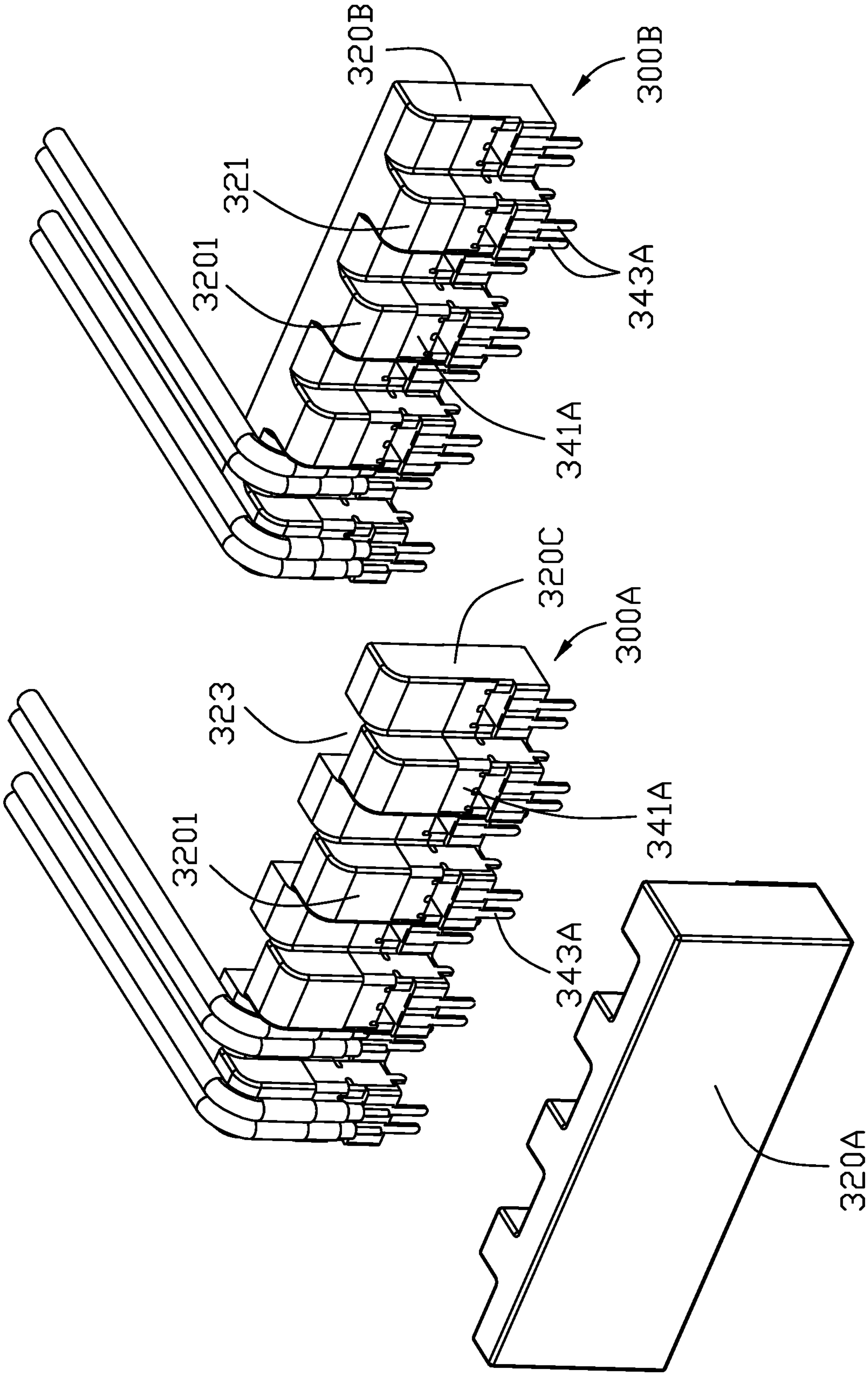
FIG. 16 is an exploded perspective view of a group of the cable modules of FIG. 15.
Figure 17:
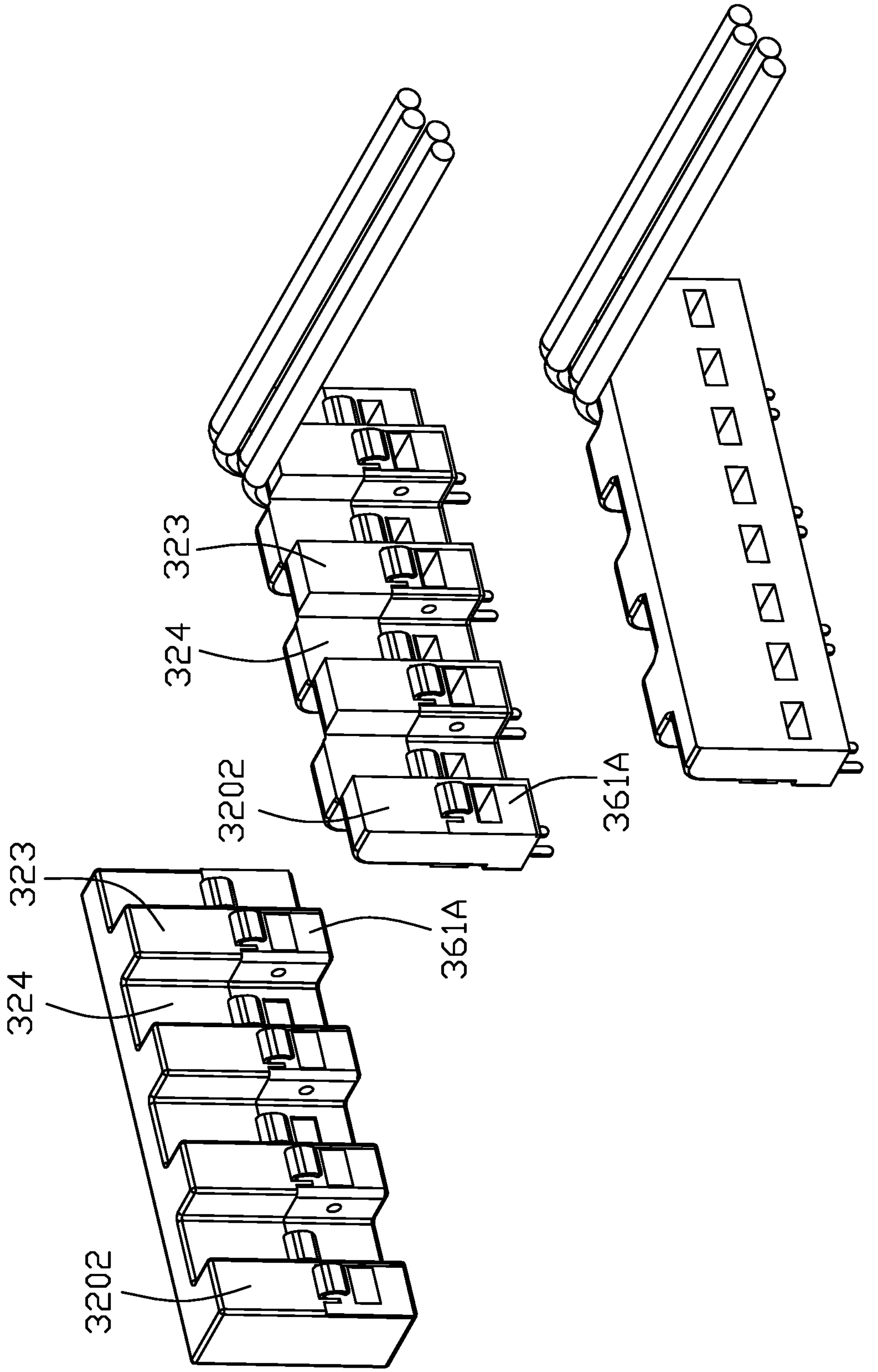
FIG. 17 is another exploded perspective view of the group of the cable modules of FIG. 15.
Figure 18:
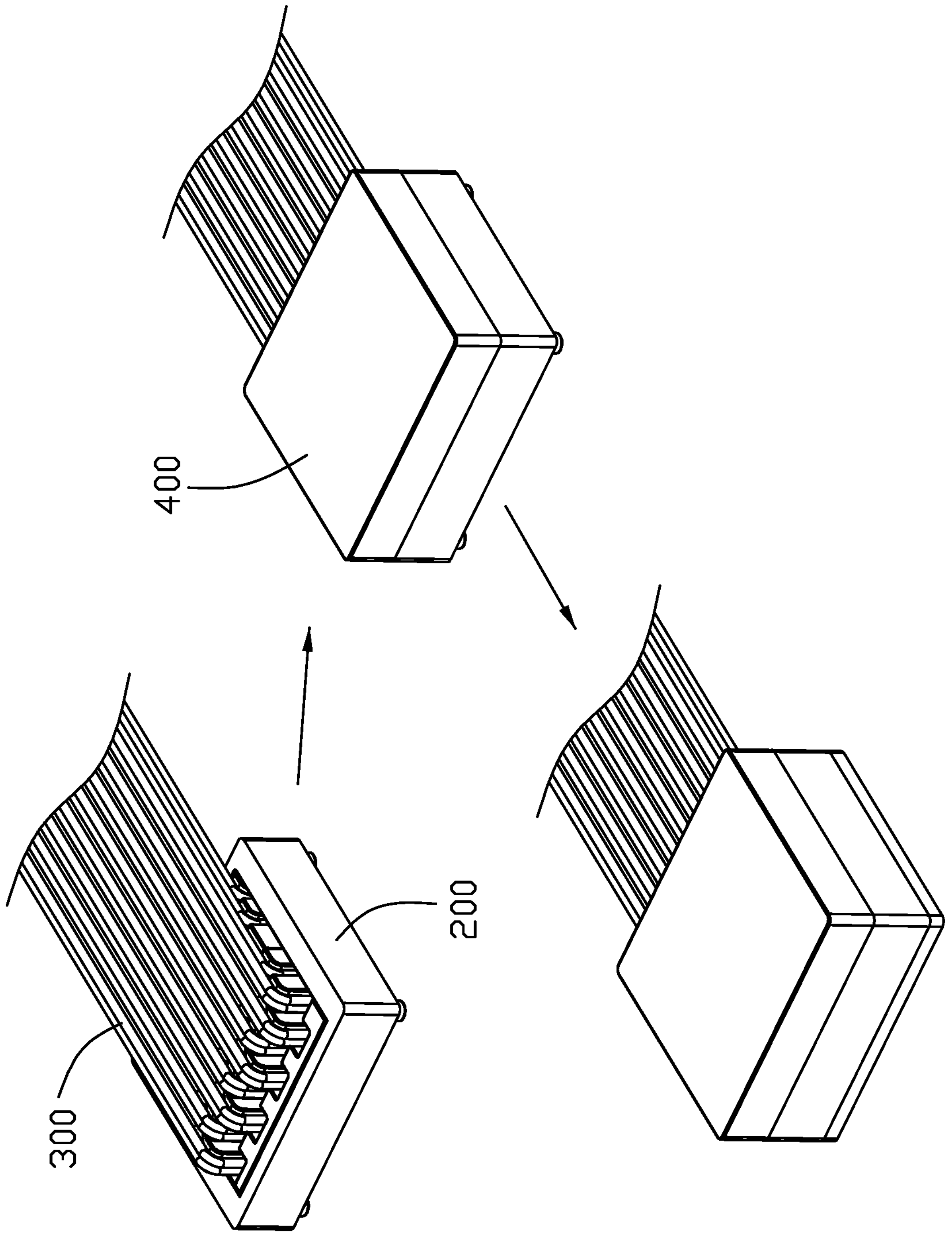
FIG. 18 shows an assembling method of the cable assembly of FIG. 1.
Figure 19:
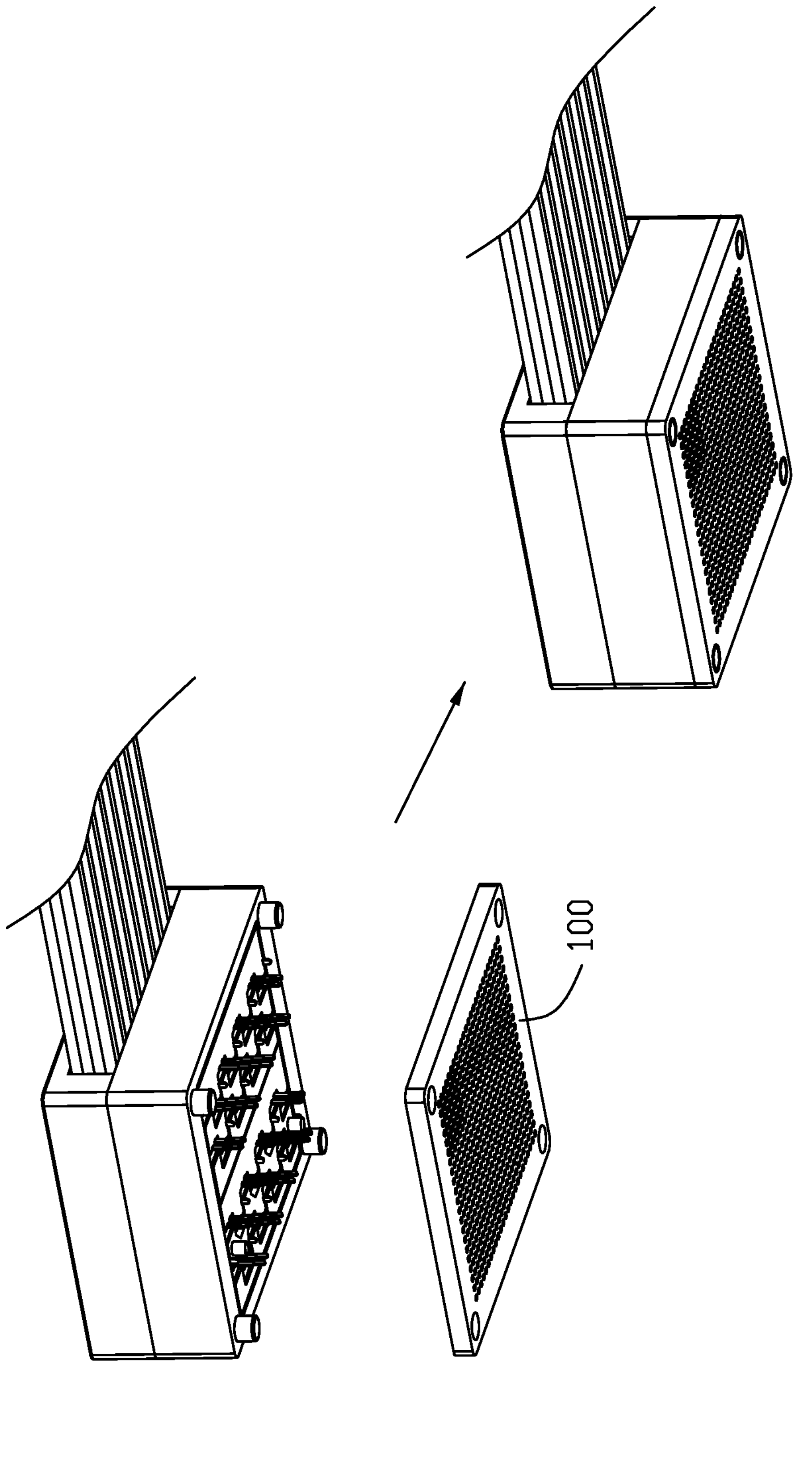
FIG. 19 shows how the cable assembly is assembled upon the printed circuit board.

Referring to FIGS. 16-17, in this embodiment, the cable modules 300 are arranged with two groups same to each other, each group has similar forming process while different in constructions. The first cable module 300A is made by said process, that means the first cable module 300A has the front grounding bar 341A and the rear grounding bar 361B embedded in the first insulative bar 320A. The first insulative bar 320A has projecting portions 321/323 and recesses 322/324 at front and rear sides thereof in the transverse direction. The front grounding bar 341A and the contacts 343A exposed upon the peak and valley faces at the front side 3201 of the insulative bar 320A of the first cable module. The rear grounding bar 361A exposed upon the rear side 3202 of the first insulative bar 320A of the first cable module 300A. The pairs of wires 380 are located in the peak and the valley faces at the first side 3201.

The second cable module 300B has projecting portions 321 and recesses 322 at front side 3201 thereof in the transverse direction and the pairs of the contacts 343A and the front grounding bar 341A are located in the peak and valley faces thereof, while the second insulative bar 320B has no projecting portions at the rear side thereof, and no second grounding bar are provided at the rear side of the second insulative bar 320B. After assembled, projecting portions 321 and the recesses 322 of the second cable module 300B are matched with the corresponding recesses 323 and the projecting portions 324 at the rear side 3202 of the first cable module 300A.

The assisting insulative bar 320 has projecting portions 323 and recesses 324 at a rear side 3202 thereof in the transverse direction and a rear ground bar 361A is embedded in the assisting insulative bar 320 and exposes upon the faces of the projecting portions and the recesses respectively. The projecting portions 323 and the recesses 324 of the assisting insulative bar are matched with the corresponding recesses 321 and the projecting portions 321 at the front side 3201 of the first cable module 300A. In alternative embodiments, more first cable module 300A can be disposed between the second cable module 300B and the assisting insulating bar 320.

Once assembled, the whole unit including the modules 300, the housing 200 and the top cover 400, is mounted upon the printed circuit board 100 wherein the mounting legs are inserted into the corresponding signal holes in the printed circuit board 100 while the grounding legs 346 are retained in the grounding vias. The insulative bar 320 further includes posts 322 for mounting to the corresponding holes of the printed circuit board 100. Notably, the wires 380 are bent at a right angle with four arrays.

In this embodiment, the electrical cable assembly includes a cable IMLA module enclosed within an organizer housing for mounting upon a printed circuit board. The cable IMLA module includes a plurality of insulative bars each integrally formed with two, the first and the second, corresponding grounding bars via two-shot insert-molding to mechanically and electrically connected to the metallic braiding layers of the respective wires, and a plurality of mounting legs, which are originally connected to one of the two grounding bars and successively separated therefrom after insert-molding, respectively mechanically and electrically connected to the inner conductors of the corresponding wires wherein the mounting legs are soldered into the corresponding vias of the printed circuit board.

The insulative bar and the corresponding grounding bars are of a zigzag like structure to form the corresponding spaces receiving the corresponding differential-pair wires with the corresponding grounding bars surrounding the differential pair wires for better shielding. One of the first and the second grounding bars includes mounting legs connected to the grounding traces of the printed circuit board.

While a preferred embodiment in accordance with the present disclosure has been shown and described, equivalent modifications and changes known to persons skilled in the art according to the spirit of the present disclosure are considered within the scope of the present disclosure as described in the appended claims.

What is claimed is:

1. A cable assembly comprising:

an organizer;

a first cable module and a second cable module stacked with each other in a transverse direction and received within the organizer, each of the first and second cable modules comprising:

an insulative bar defining a plurality of projecting portions and recesses at a front side thereof in a transverse direction and alternately arranged along a longitudinal direction perpendicular to the transverse direction;

a front grounding bar embedded with the insulative bar and exposed upon the projecting portions and the recesses at the front side;

pairs of contacts embedded with the insulative bar, each of the projecting portions and the recesses exposed with one pair of contacts, each contact comprising a mounting leg extending downward from the insulative bar; and a plurality of differential-pair wires each having an inner conductor mechanically and electrically connected to a corresponding contact, and a metallic braiding layer mechanically and electrically connected to the front grounding bar;

wherein the insulative bar of the first cable module further defines a plurality of projecting portions and recesses at a rear side thereof in the transverse direction and alternately arranged in the longitudinal direction, and the projecting portions and the recesses of the second cable module match with the corresponding recesses and projecting portions at the rear side of the first cable module.

2. The cable assembly as claimed in claim 1, wherein the first cable module further comprises a rear grounding bar embedded with the insulative bar and exposed upon the projecting portions and the recesses at the rear side thereof, and the rear grounding bar is mechanically and electrically connected to the corresponding metallic braiding layer of the differential-pair wires of the second cable module.

3. The cable assembly as claimed in claim 2, further comprising:

an assisting bar having a plurality of projecting portions and recesses at a rear side thereof in the transverse direction; and a rear grounding bar embedded in the assisting bar and exposed upon the projecting portions and recesses thereof, and wherein the projecting portions and the recesses of the assisting bar match with the corresponding recesses and projecting portions at the front side of the first cable module, and the rear grounding bar on the assisting bar is mechanically and electrically connected to the corresponding metallic braiding layers of the differential-pair wires of the first cable module.

4. The cable assembly as claimed in claim 3, wherein the rear grounding bars in the first cable module and the assisting bar define spring tabs exposed upon the projecting portions and the recesses and touch the corresponding metallic braiding layers of the differential-pair wires.

5. The cable assembly as claimed in claim 1, wherein in each of the first and second cable modules, the contacts are originally connected to the front grounding bar via linking portions, respectively, and then the corresponding linking portions are removed after the front grounding bar is embedded in the insulative bar.

6. The cable assembly as claimed in claim 1, further comprising a printed circuit board, wherein the mounting legs of the contacts extend into corresponding holes in the printed circuit board, and the front ground bar further comprises a plurality of grounding legs extending into the corresponding holes of the printed circuit board.

* * * * *